US008644166B2

(12) United States Patent
Xia et al.

(10) Patent No.: US 8,644,166 B2
(45) Date of Patent: Feb. 4, 2014

(54) SENSOR HAVING AN INTEGRATED ZIGBEE® DEVICE FOR COMMUNICATION WITH ZIGBEE® ENABLED APPLIANCES TO CONTROL AND MONITOR ZIGBEE® ENABLED APPLIANCES

(75) Inventors: Mingyao Xia, Shenzhen (CN); Eric Grubel, Thousand Oaks, CA (US); Dan Castellano, Cupertino, CA (US)

(73) Assignee: Asoka USA Corporation, Santa Clara, CA (US)

( * ) Notice: Subject to any disclaimer, the term of this patent is extended or adjusted under 35 U.S.C. 154(b) by 153 days.

(21) Appl. No.: 13/197,623

(22) Filed: Aug. 3, 2011

(65) Prior Publication Data

US 2012/0307646 A1 Dec. 6, 2012

Related U.S. Application Data

(63) Continuation-in-part of application No. 13/153,194, filed on Jun. 3, 2011, now Pat. No. 8,364,326.

(51) Int. Cl.
*G01R 31/08* (2006.01)
*G06F 11/00* (2006.01)
*H04W 4/00* (2009.01)
*H04B 3/30* (2006.01)

(52) U.S. Cl.
USPC ........ 370/241; 370/285; 370/329; 340/855.8; 340/855.9; 340/12.32; 340/12.39

(58) Field of Classification Search
None
See application file for complete search history.

(56) References Cited

U.S. PATENT DOCUMENTS

| 5,090,024 | A | 2/1992 | Vander Mey et al. |
| 5,553,072 | A | 9/1996 | Daggett et al. |
| 5,572,438 | A | 11/1996 | Ehlers et al. |
| 5,630,204 | A | 5/1997 | Hylton et al. |
| 5,999,612 | A | 12/1999 | Dunn et al. |
| 6,252,883 | B1 | 6/2001 | Schweickart et al. |
| 6,378,131 | B2 | 4/2002 | Cunningham et al. |
| 6,553,418 | B1 | 4/2003 | Collins et al. |
| 6,633,823 | B2 | 10/2003 | Bartone et al. |
| 6,826,607 | B1 | 11/2004 | Gelvin et al. |
| 6,854,059 | B2 | 2/2005 | Gardner |
| 6,882,709 | B1 | 4/2005 | Sherlock et al. |
| 6,956,464 | B2 | 10/2005 | Wang et al. |
| 6,961,641 | B1 | 11/2005 | Forth et al. |

(Continued)

OTHER PUBLICATIONS

Heile, "Smart Grids for Green Communications", IEEE Wireless Communications, Jun. 2010, pp. 4-6 (online). Retrieved on Jul. 4, 2012, internet URL:,http://dl.comsoc.org/livepubs/pci/public/2010/jun/pdf/wciindpersp.pdf>, entire document, 4-6.

*Primary Examiner* — Hassan Phillips
*Assistant Examiner* — Lonnie Sweet
(74) *Attorney, Agent, or Firm* — Michael A. Glenn; Perkins Coie LLP (57) ABSTRACT

A sensor device integrates ZigBee® technology into power switch device to provide monitoring and control of power usage, as well as operational control of connected devices. The sensor device uses a power line communication (PLC) network to transfer collected data and to provide remote control capability to connected appliances. The sensor device, in conjunction with a master switch device, a communication enabled switching device, and the power switch device, provides an integrated home environment for communication, streaming media, monitoring, and remote control of power usage, as well as remote operational monitoring and control of connected appliances in the home.

11 Claims, 8 Drawing Sheets

(56) References Cited

U.S. PATENT DOCUMENTS

| | | |
|---|---|---|
| 6,988,025 B2 | 1/2006 | Ransom et al. |
| 6,990,395 B2 | 1/2006 | Ransom et al. |
| 6,993,417 B2 | 1/2006 | Osann, Jr. |
| 7,020,701 B1 | 3/2006 | Gelvin et al. |
| 7,113,763 B2 | 9/2006 | Heinonen et al. |
| 7,136,936 B2 | 11/2006 | Chan et al. |
| 7,142,094 B1 | 11/2006 | Davidow et al. |
| 7,173,938 B1 | 2/2007 | Davidow |
| 7,194,528 B1 | 3/2007 | Davidow |
| 7,231,280 B2 | 6/2007 | Costa |
| 7,231,281 B2 | 6/2007 | Costa |
| 7,245,472 B2 | 7/2007 | Davidow |
| 7,319,717 B2 | 1/2008 | Zitting |
| 7,345,998 B2 | 3/2008 | Cregg et al. |
| 7,363,398 B2 | 4/2008 | Scott |
| 7,415,541 B2 | 8/2008 | Chan et al. |
| 7,423,546 B1 | 9/2008 | Aisa |
| 7,444,401 B1 | 10/2008 | Keyghobad |
| 7,461,174 B2 | 12/2008 | Chan et al. |
| 7,463,986 B2 | 12/2008 | Hayes |
| 7,688,841 B2 | 3/2010 | Binder |
| 7,690,949 B2 | 4/2010 | Binder |
| 7,701,331 B2 | 4/2010 | Tran |
| 7,734,380 B2 | 6/2010 | Ransom et al. |
| 7,734,572 B2 | 6/2010 | Wiemeyer et al. |
| 7,738,999 B2 | 6/2010 | Petite |
| 7,751,795 B2 | 7/2010 | McCarty et al. |
| 7,752,309 B2 | 7/2010 | Keyghobad et al. |
| 7,769,907 B2 | 8/2010 | Chan et al. |
| 7,769,908 B2 | 8/2010 | Chan et al. |
| 7,773,361 B2 | 8/2010 | Davidow |
| 7,778,152 B2 | 8/2010 | Chan |
| 7,825,793 B1 | 11/2010 | Spillman et al. |
| 7,826,395 B2 | 11/2010 | Kim et al. |
| 8,213,895 B2 | 7/2012 | Hurwitz et al. |
| 8,306,634 B2 | 11/2012 | Nguyen et al. |
| 8,503,150 B2 | 8/2013 | Chang |
| 2002/0023267 A1 | 2/2002 | Hoang |
| 2002/0026646 A1 | 2/2002 | Hoang |
| 2002/0114336 A1 | 8/2002 | Chow |
| 2002/0165943 A1 | 11/2002 | Hoang |
| 2002/0170059 A1 | 11/2002 | Hoang |
| 2003/0050737 A1 | 3/2003 | Osann, Jr. |
| 2004/0138786 A1 | 7/2004 | Blacket et al. |
| 2004/0139472 A1 | 7/2004 | Furet et al. |
| 2004/0155985 A1 | 8/2004 | Dethier |
| 2004/0193329 A1 | 9/2004 | Ransom et al. |
| 2004/0212481 A1 | 10/2004 | Abraham |
| 2005/0008345 A1 | 1/2005 | Choi |
| 2005/0157215 A1 | 7/2005 | Minnick et al. |
| 2005/0160467 A1 | 7/2005 | Moons et al. |
| 2005/0184867 A1 | 8/2005 | Osann, Jr. |
| 2005/0207079 A1 | 9/2005 | Tiller et al. |
| 2005/0272402 A1 | 12/2005 | Ferentz et al. |
| 2006/0049694 A1 | 3/2006 | Kates |
| 2006/0088149 A1 | 4/2006 | Sung |
| 2006/0168624 A1 | 7/2006 | Carney et al. |
| 2006/0227884 A1* | 10/2006 | Koga et al. ................. 375/257 |
| 2007/0043477 A1 | 2/2007 | Ehlers |
| 2007/0132579 A1 | 6/2007 | Kim |
| 2007/0183543 A1 | 8/2007 | Lu |
| 2007/0204286 A1 | 8/2007 | Candelore |
| 2007/0213879 A1 | 9/2007 | Iwamura |
| 2007/0229231 A1 | 10/2007 | Hurwitz et al. |
| 2007/0233323 A1 | 10/2007 | Wiemeyer et al. |
| 2007/0250900 A1 | 10/2007 | Marcuvitz |
| 2008/0015740 A1 | 1/2008 | Osann, Jr. |
| 2008/0024605 A1 | 1/2008 | Osann, Jr. |
| 2008/0106146 A1 | 5/2008 | Baek et al. |
| 2008/0130640 A1 | 6/2008 | Hurwitz et al. |
| 2008/0137572 A1 | 6/2008 | Park et al. |
| 2008/0221737 A1 | 9/2008 | Josephson et al. |
| 2008/0317070 A1 | 12/2008 | Propp et al. |
| 2009/0040057 A1 | 2/2009 | Keyghobad et al. |
| 2009/0117915 A1 | 5/2009 | Lee et al. |
| 2009/0187499 A1 | 7/2009 | Mulder et al. |
| 2009/0195349 A1 | 8/2009 | Frader-Thompson et al. |
| 2009/0287838 A1 | 11/2009 | Keyghobad et al. |
| 2009/0287966 A1 | 11/2009 | Keyghobad et al. |
| 2009/0319853 A1 | 12/2009 | Keyghobad et al. |
| 2010/0027599 A1 | 2/2010 | Di Chiro et al. |
| 2010/0070217 A1* | 3/2010 | Shimada et al. ................. 702/62 |
| 2010/0076701 A1 | 3/2010 | Harish |
| 2010/0094475 A1 | 4/2010 | Masters et al. |
| 2010/0097528 A1 | 4/2010 | Seo |
| 2010/0102987 A1 | 4/2010 | Lou et al. |
| 2010/0121968 A1 | 5/2010 | Clark |
| 2010/0156666 A1 | 6/2010 | Choi et al. |
| 2010/0169940 A1 | 7/2010 | Howarter et al. |
| 2010/0182160 A1 | 7/2010 | Lu |
| 2010/0204850 A1 | 8/2010 | Hendrieckx |
| 2010/0207728 A1 | 8/2010 | Roscoe et al. |
| 2010/0217449 A1 | 8/2010 | Musti et al. |
| 2010/0233975 A1 | 9/2010 | Wu et al. |
| 2010/0241245 A1 | 9/2010 | Wiemeyer et al. |
| 2010/0250497 A1 | 9/2010 | Redlich et al. |
| 2010/0292858 A1 | 11/2010 | Iwamura et al. |
| 2010/0327766 A1 | 12/2010 | Recker et al. |
| 2011/0035491 A1 | 2/2011 | Gelvin et al. |
| 2011/0037589 A1 | 2/2011 | Liu et al. |
| 2011/0040785 A1 | 2/2011 | Steenberg et al. |
| 2011/0054700 A1 | 3/2011 | Chan et al. |
| 2011/0054710 A1 | 3/2011 | Imes et al. |
| 2011/0066300 A1 | 3/2011 | Tyagi et al. |
| 2011/0077758 A1 | 3/2011 | Tran et al. |
| 2011/0082599 A1* | 4/2011 | Shinde et al. ................. 700/295 |
| 2011/0087522 A1 | 4/2011 | Beaty et al. |
| 2011/0121654 A1 | 5/2011 | Recker et al. |
| 2011/0161251 A1 | 6/2011 | Carey et al. |
| 2011/0184581 A1 | 7/2011 | Storch et al. |
| 2011/0196547 A1 | 8/2011 | Park et al. |
| 2011/0202190 A1* | 8/2011 | Venkatakrishnan et al. .. 700/286 |
| 2011/0202198 A1 | 8/2011 | Venkatakrishnan et al. |
| 2011/0202910 A1 | 8/2011 | Venkatakrishnan et al. |
| 2011/0215736 A1 | 9/2011 | Horbst et al. |
| 2011/0231320 A1 | 9/2011 | Irving |
| 2011/0238235 A1 | 9/2011 | Xia |
| 2011/0264291 A1 | 10/2011 | Le Roux et al. |
| 2011/0271317 A1 | 11/2011 | Xia et al. |
| 2011/0307109 A1 | 12/2011 | Sri-Jayantha |
| 2012/0001548 A1 | 1/2012 | Recker et al. |
| 2012/0053737 A1 | 3/2012 | Valluri et al. |
| 2012/0066023 A1 | 3/2012 | Xia |

* cited by examiner

SENSOR HAVING AN INTEGRATED ZIGBEE® DEVICE FOR COMMUNICATION WITH ZIGBEE® ENABLED APPLIANCES TO CONTROL AND MONITOR ZIGBEE® ENABLED APPLIANCES

CROSS REFERENCE TO RELATED APPLICATIONS

This application is a continuation-in-part of U.S. patent application Ser. No. 13/153,194, filed Jun. 3, 2011 now U.S. Pat. No. 8,364,326 which, in turn, claims priority from U.S. patent application Ser. No. 13/032,454, filed Feb. 22, 2011, each of which is incorporated herein in its entirety by this reference thereto.

BACKGROUND OF THE INVENTION

1. Technical Field

The invention relates to interfacing ZigBee® technology with power line networking that is enabled for communication and media streaming for remote monitoring and control of utilities such as power, gas, and water. More particularly, the invention relates to a sensor having an integrated Zigbee® device for communication with Zigbee® enabled appliances to control and monitor Zigbee® enabled appliances.

2. Description of the Background Art

Communications via power lines has been known from early in the 20$^{th}$ century. Due to its higher costs and other limitations for extending connectivity, the use of power line communication (PLC) systems has been limited to local area networks (LANs) within homes or offices or, at best, within apartment complexes. PLC has also found a limited number of applications where other types of communication methods do not provide the security and remote connectivity, such as for power line control applications. Basic devices for connecting to the power line for communication and power supply have been designed and used to provide service within LANs. Due to more efficient competing technologies, the infrastructure for PLC never developed to make it a mainstream technology. As a result, more advanced devices for communication using the PLC technology also were never developed.

It is advantageous to identify applications where PLC technology can be optimally used and to develop devices and systems to cater to such applications. One such application that is emerging is in connection with the collection of information and the provision of remote control capability for appliances to reduce the carbon footprint of the home. If this emerging application can simultaneously provide a local area network capability that caters to the needs of communication and streaming media delivery within a home or office, it would be an optimum application for PLC technology. While this is a promising application for the future growth and development of PLC technology, it is still necessary to develop and implement suitable sensor units and systems to meet the needs of this technology and to bring forth its full potential.

SUMMARY OF THE INVENTION

ZigBee® smart energy (www.zigbee.org/) is the world's leading standard for interoperable products that monitor, control, inform, and automate the delivery, control, and use of energy and water. It helps create greener homes by giving consumers the information and automation capability needed to reduce their consumption easily and save money. These products also make it easy for utilities and governments to deploy smart grid solutions that are secure, easy to install, and consumer-friendly. A presently preferred embodiment of the invention combines the residential power monitoring and control capability established using a PLC network with an integrated ZigBee® device to provide a powerful tool for integrated power and operational control of connected appliances in the home or office.

An embodiment of the invention provides a method and apparatus for monitoring and control of power usage, as well as operational control of connected devices. A sensor device integrates ZigBee® technology into the power switch device. The sensor device allows collection and control of the power usage, monitors utilities usage, and controls operation of connected in-home appliances enabled with ZigBee® technology.

In an embodiment, the sensor device uses the PLC network in the home to transfer collected data and to provide remote control capability to connected appliances. The sensor device, in conjunction with a master switch device, a communication enabled switching device, and the power switch device, provides an integrated home environment for communication, streaming media, monitoring, and remote control of power usage, as well as remote operational monitoring and control of connected appliances in the home.

DETAILED DESCRIPTION OF THE INVENTION

ZigBee® smart energy (www.zigbee.org/) is the world's leading standard for interoperable products that monitor, control, inform, and automate the delivery, control, and use of energy and water. It helps create greener homes by giving consumers the information and automation capability needed to reduce their consumption easily and save money. These products also make it easy for utilities and governments to deploy smart grid solutions that are secure, easy to install, and consumer-friendly. A presently preferred embodiment of the invention combines the residential power monitoring and control capability established using a PLC network with an integrated ZigBee® device to provide a powerful tool for integrated power and operational control of connected appliances in the home or office.

An embodiment of the invention provides a method and apparatus for monitoring and control of power usage, as well as operational control of connected devices. A sensor device integrates ZigBee® technology into the power switch device. The sensor device allows collection and control of the power usage, monitors utilities usage, and controls operation of connected in-home appliances enabled with ZigBee® technology.

In an embodiment, the sensor device uses the PLC network in the home to transfer collected data and to provide remote control capability to connected appliances. The sensor device, in conjunction with a master switch device, a communication enabled switching device, and the power switch device, provides an integrated home environment for communication, streaming media, monitoring, and remote control of power usage, as well as remote operational monitoring and control of connected appliances in the home.

A new sensor device, which integrates ZigBee® technology into the power switch (SW) device is disclosed. The herein disclosed integrated ZigBee® technology enabled power switch (Z-SW) device allows collection and control of the power usage by, and operational control of, connected in-home appliances that have been enabled with ZigBee® technology. The Z-SW device uses the PLC network in the home or office to transfer collected data and to provide remote control capability for power switching, as well as for operation of an appliance connected to the Z-SW device. A Z-SW device, working in conjunction with a master switch (MST) device, a communication enabled switching (ETH) device, and the power switch (SW) device, enables an integrated home environment for communication, streaming media, monitoring, and remote control of power usage, as well as remote operational monitoring with control of the connected appliance in the home or office. Those skilled in the art will appreciate that, while the home and office are discussed herein with regard to application of the herein disclosed invention, other environments may be serviced by the invention as well, and the invention is not limited to only home and office applications.

The development of green technologies and the need for monitoring and control of the carbon footprint of homes and offices has created a need to assess power usage patterns and the magnitude of usage remotely, and to supervise and control the power used by individual appliances remotely. It is advantageous for the consumer to monitor and control power use on a micro level. Providing the proper tools, such as the SW and Z-SW, allows the consumer to exercise the necessary constraints and controls on power use. It is also necessary to monitor the usage pattern and collect data on a macro level to develop policies that are beneficial to the overall reduction of the carbon foot print at the home and office level, as well as on a national level. Empowering the individual and the society to exercise the necessary controls by monitoring and controlling the power usage is an area where the PLC and control can be effectively and optimally used.

An embodiment of the invention, by combining ZigBee® technology into the power switch (SW) device enables the operation of ZigBee® technology enabled intelligent appliances connected to the Z-SW to be controlled via a wireless connection established by the built in ZigBee® device. Further, ZigBee® technology integration into a Z-SW enables monitoring of water, gas, air-conditioning, and security systems within the home or office through the in-built communication channel of the Z-SW. The operational control and monitoring information collected by the built-in ZigBee® functionality is combined with the power usage, monitoring, and control enabled by the SW for connected appliances. This information is transmitted over the in-home PLC network efficiently for any compilation or action required. This above capability is established in addition to the PLC LAN capability made available by use of the communication enabled power monitoring and control device (ETH) and the master unit (MST) described previously in the patent application Ser. No. 13/032,454, which application is incorporated herein in its entirety by this reference thereto.

Figure 1:
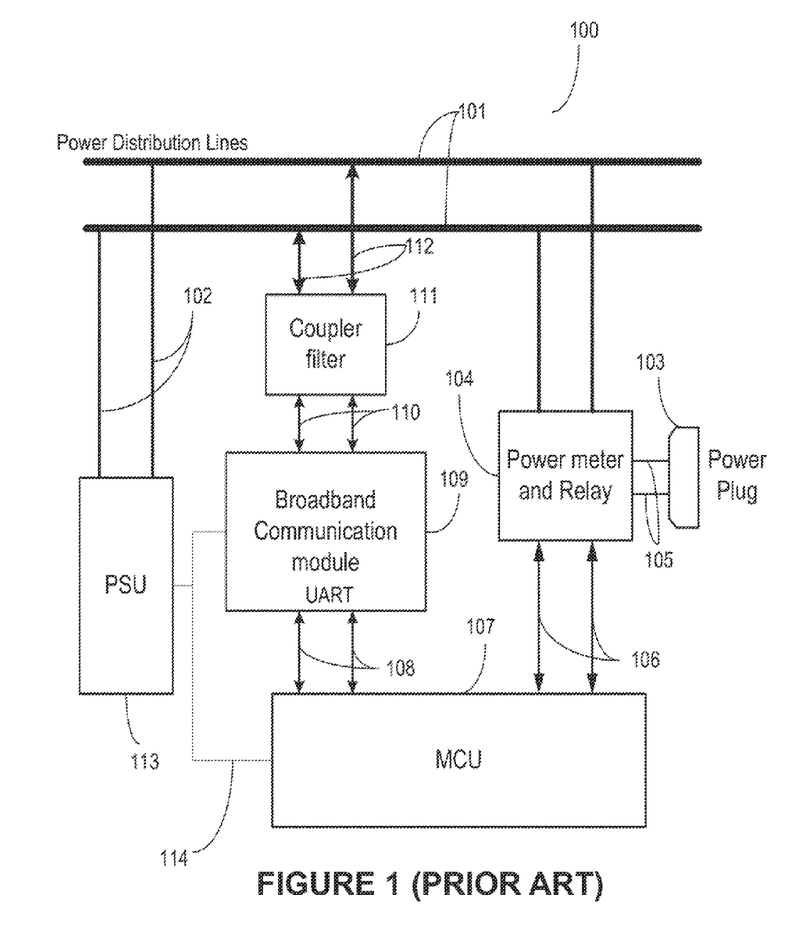
FIG. 1 is a block schematic diagram of a power switch unit (SW) having broadband information transfer capability.

FIG. 1 is a block schematic diagram of the SW unit 100 without the integrated ZigBee® device. This arrangement allows an appliance in the home or office to be connected to a power supply through the SW device. The SW device provides for the monitoring of power consumption, with the capability for remote control of the power flow to the connected appliance via the Internet. The SW unit 100 has a power plug 103 that is connected to the AC power distribution lines 101 through a power meter and relay 104. The relay in the power meter and relay module 104 provides the capability to switch on or switch off the supply to the power plug 103 remotely. It also allows for controlling the power supplied to the plug when a power control module is included in the power meter and relay module 104. The power meter in the power meter and relay module 104 monitors the power usage by the appliances connected to the power plug. The power meter and relay module 104 is connected via bi-directional communication links 106 to a microcontroller (MCU) 107, for example a microcontroller similar to an Intel® 8051. The microcontroller accepts the information on power usage and compiles it prior to transfer to the broadband communication module 109. The power meter in the power meter and relay module 104 continuously monitors the flow of power to the power plug 103 and feeds the information to the MCU 107 through the communication links 106. The power usage information is compiled by the MCU 107 and sent to a broadband communication module 109 via communication links 108 connected to a UART enabled port on the communication module 109.

In FIG. 1, the communication module 109 modulates the received information to a communication data stream for transmission over a broadband communication frequency band that is typically used for PLC over the AC power distribution lines within a local area network (LAN). The typical broadband used for PLC communication band in the 2 to 30 MHz range provides an up to 200 Mbps data rate. The communication module 109 sends out the modulated data stream over broadband connection 110 to a coupler filter 111 which is connected to the AC power distribution lines 101 by power line connections 112. The coupler filter acts as a bi-directional high pass filter to filter out power line frequency from the communication module. The broadband communication module 109 also demodulates the communication stream received over the AC power distribution lines 101 to provide command and control instructions for power control to the MCU 107. The MCU 107 interprets any received command and control instructions and instructs the power meter and relay module 104, thus controlling the power flow to the power plug 103.

Figure 2:
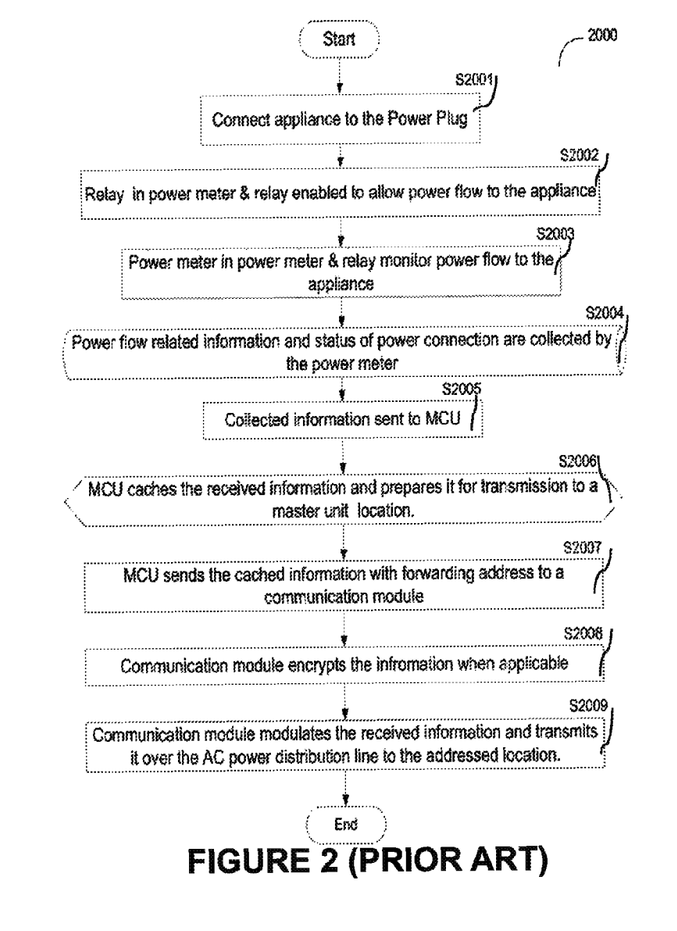
FIG. 2 is a flowchart showing the collection and transmission of information of power usage of appliance and status of a power plug of an SW unit.

FIG. 2 is a flowchart 2000 showing the operation of the SW 100 as it collects and transmits power usage and power plug 103 status information when an appliance is connected to the power plug 103.

An appliance, such as but not limited to, a refrigerator, a washer, or an oven, is connected to the power plug 103 (S2001).

The power plug 103 is enabled when the relay in the power meter and relay module 104 is closed (relay enabled). Power flows from the AC power distribution lines 101 supplying the home or office to the appliance through the power meter and relay module 104 and the noise filter 103*a* (S2002).

The power meter and relay module 104 monitors the power usage of the appliance by checking the power flow through the power meter and relay module 104 and the plug 103 (S2003).

The power usage information and the on state or off state of the relay and, hence, power connection are collected by the power meter in the power meter and relay unit 104 (S2004).

This collected information on the status of the power connection is passed on to an MCU 107 for compilation and consolidation (S2005).

The MCU 107 caches the received information. The MCU 107 compiles and consolidates the cached information making it ready for transfer to an MST (S2006).

The prepared information, ready for transfer to a master unit (MST) connected on the power distribution lines 101, is forwarded with the address of the MST to a communication module 109 (S2007).

The communication module 109 receives the information and address of an addressee from the MCU 107. The MCU 107 encrypts the information and combines the encrypted information with the address provided (S2008).

This encrypted information and address are then modulated by the communication module 109. The broadband modulation frequency band used and the type of modulation are as defined in the description of the SW (S2009).

The communication module 109 then sends this modulated information stream onto the AC power distribution lines 101 for transmission to the MST through a coupler filter 111. The filter blocks unwanted frequencies from entering and impacting the operation of the communication module 109 (S2010).

Figure 3:
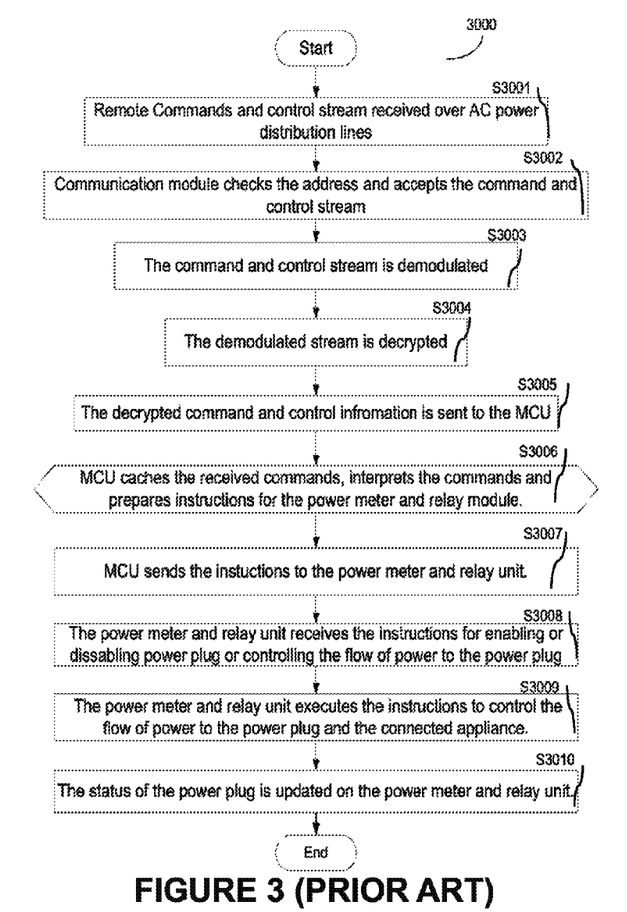
FIG. 3 is a flowchart showing remote control of the power in a power plug of an SW unit.

FIG. 3 is a flowchart 3000 showing the operation of a SW 100 unit while providing for remote control of the power flow to an appliance that is connected to the power plug 103. Any information or status changes due to a remote command and control stream are sent back over AC power distribution lines 101 as described in FIG. 3.

The command and control input stream modulated by the correct transmission frequency to control the status and power flow through the SW 100 remotely is delivered over the AC power distribution lines 101 (S3001).

The command and control input stream is passed to the communication module 109 of connected SW 100 through the coupler filter module 111. The communication module 109 demodulates the received command control input stream (S3002).

The addressee of the received demodulated input stream is checked and, if found to be of the specific SW 100, the demodulated input stream is accepted by the SW100 for further processing by the communication module 109 (S3003).

The demodulated command and control stream is decrypted in the communication module 109 to extract the associated command and control inputs for the SW 100 (S3004).

The extracted command and control inputs are passed to the MCU 107 for caching and interpretation (S3005).

The MCU 107 caches the inputs received and interprets them to generate a set of instructions for execution by the power meter and relay module 104. The interpreted instructions include instructions to enable the power flow to the power plug by engaging the relay and to disable the power flow to the power plug by disengaging the relay. If the power meter and relay 104 include power control circuitry, then specific control instructions are provided to the connected appliance on power input (S3006).

The generated instructions are sent to the power meter and relay module 104 of the SW (S3007).

The power meter and relay module 104 receives the instructions sent by the MCU 107 for power flow control to the connected appliance (S3008).

The power meter and relay module 104 acknowledges the instructions from the MCU 107 and executes the instructions received to enable, disable, or otherwise control the power flow to the appliance connected to the power plug 103 (S3009).

The status of the relay and the power usage of the connected power plug 103 are updated on the power meter and relay module 104, and updated power usage and relay status is sent to the MCU 107 for communication back to the initiating remote site (S3010).

Figure 4:
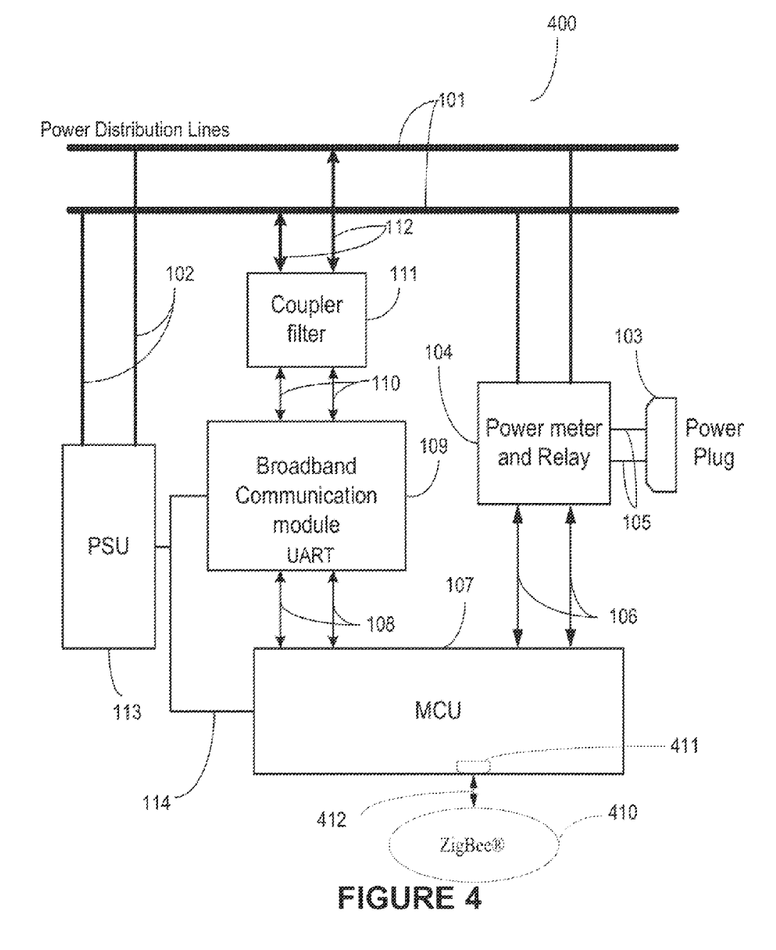
FIG. 4 is a block schematic diagram of an integrated SW with a ZigBee® enabled (Z-SW) for appliance monitoring, control, and connectivity according to the invention.

FIG. 4 is a block schematic diagram of the Z-SW 400 unit with an integrated ZigBee® device 410. This arrangement allows an appliance in the home or office to be connected to the power supply and PLC link through the Z-SW 400 unit which incorporate a ZigBee® device 410. The Z-SW 400 device monitors power consumption and provides a capability for remote control via the Internet of the power flow to the connected appliance. The ZigBee® device 410 also provides operational control and monitoring through the wireless connection to ZigBee® technology enabled appliances.

The Z-SW unit 400 has a power plug 103 that is connected to the AC power distribution lines 101 through a power meter and relay module 104. The relay in the power meter and relay module 104 provides the capability to switch on or switch off the supply to the power plug 103 remotely. It also allows for controlling the power supplied to the plug when a power control module is included in the power meter and relay module 104. The power meter in the power meter and relay module 104 monitors the power used by the appliances connected to the power plug. The power meter and relay module 104 is connected via bi-directional communication links 106 to a microcontroller (MCU) 107, which can be a microcontroller that is similar to an Intel® 8051. The MCU 107 accepts the information on the power usage from the power meter and relay module 104 and compiles it prior to transfer to the broadband communication module 109. The power meter in the power meter and relay module 104 continuously monitors the flow of power to the power plug 103 and feeds the information to the MCU 107 through the communication links 106. The power usage information is compiled by the MCU 107 and sent to a broadband communication module 109 via communication links 108 that are connected to a UART enabled port on the communication module 109, thus enabling the compiled data to be transmitted out.

The operational commands for the ZigBee® device 410 of the Z-SW 400 are received over the power line and received by the broadband communication module 109 as a data stream. The data stream is demodulated, decrypted, and the resulting data are provided to the MCU 107 over the communication links 109 via the UART enabled port. The MCU 107 converts the data into instructions and passes them on to the ZigBee® device 410 via the bidirectional port 411 over the link 412. Based on received instructions, the ZigBee® device 410 sends out commands to a ZigBee® technology enabled appliance that is connected to the Z-SW 400. The Zigbee® device executes operational commands, for example reading meters, changing temperature settings, etc. The response after the command has been executed is sent back to the ZigBee® device 410 by the ZigBee® technology enabled appliance. The Zigbee® device then converts the response to an information format and passes it on to the MCU 107 via the bidirectional link 412 through the port 411. The MCU collects the information and forwards it, with the address to be responded to, to the broadband communication module 109 via communication links 108 connected to the UART enabled port on the communication module 109.

In FIG. 4, the communication module 109 modulates the received information to a communication data stream for transmission over a broadband communication frequency band that is typically used for PLC over the AC power distribution lines within a LAN. The typical broadband used for PLC communication band in the 2 to 30 MHz range provides an up to 200 Mbps data rate. The communication module 109 sends out the modulated the data stream over broadband connection 110 to a coupler filter 111 which is connected to the AC power distribution lines 101 by power line connections 112. The coupler filter is a bi-directional high pass filter that filters out power line frequency from the communication module. The broadband communication module 109 also demodulates the communication stream received over the AC power distribution lines 101 to provide the command and control instructions for power control and operational control to the MCU 107. The MCU 107 interprets any received command and control instructions to the power meter and instructs the power meter and relay module 104 to control the power flow to the power plug 103 accordingly. The MCU 107 also interprets any operational command and instructions for the ZigBee® device 410 and passes these to the ZigBee® device 410 to be directed to the ZigBee® technology enabled connected appliances.

Figure 5:
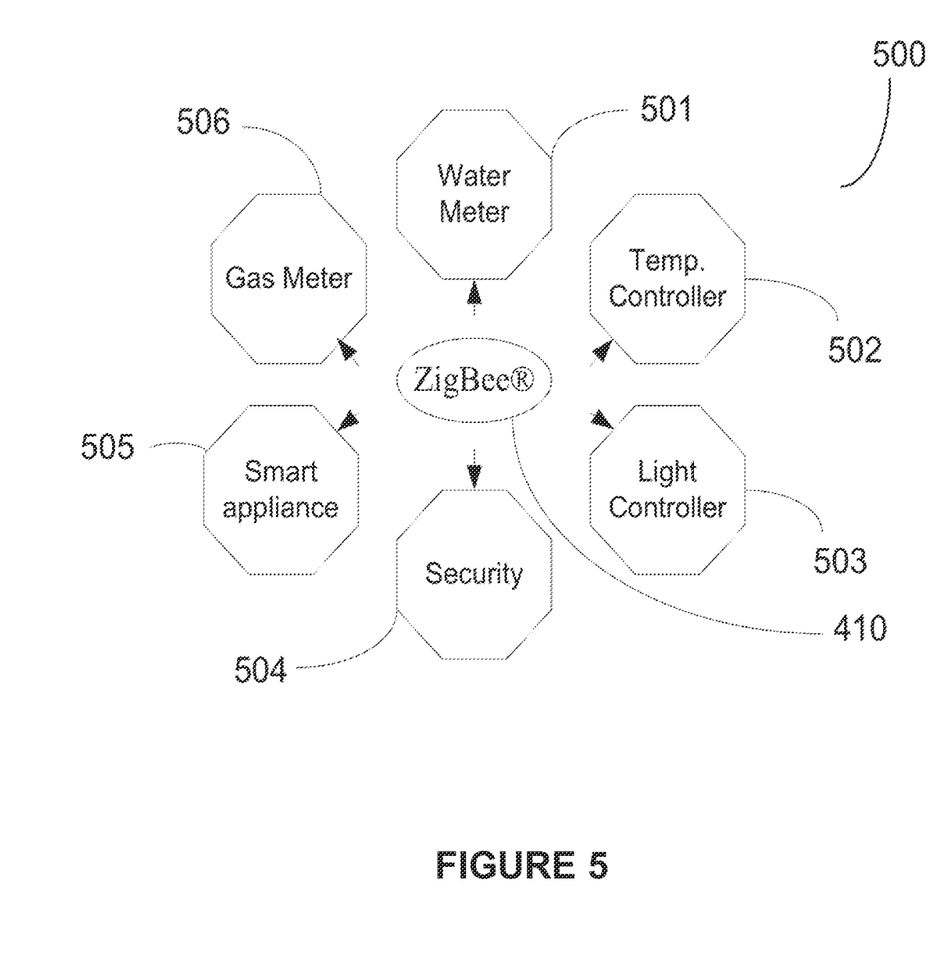
FIG. 5 is a block schematic diagram showing a group of appliances whose operation can be monitored and controlled using ZigBee® technology according to the invention.

FIG. 5 is a block schematic diagram that shows typical applications where a ZigBee® technology can provide operational status and control capability within a home or office environment. These applications can include, for example, the monitoring of gas, water, and power usage by providing remote read capability for the utilities, monitoring of security apparatus within the premises, temperature monitoring and control capability, monitoring and control of light fixtures, and monitoring of ZigBee® technology enabled smart appliances within the home.

Figure 6:
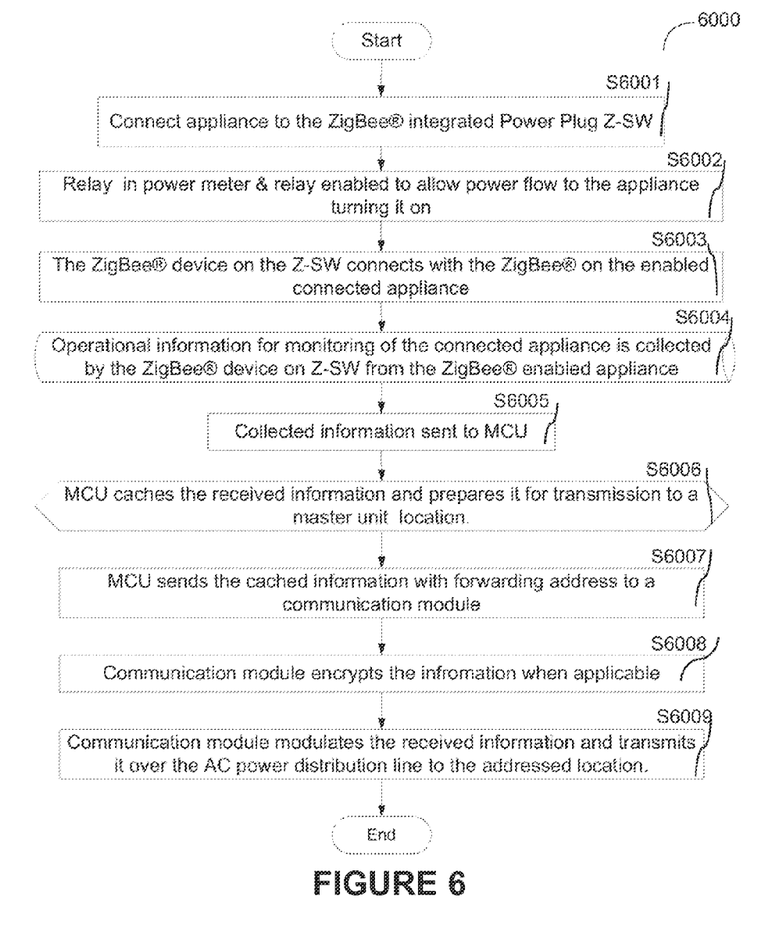
FIG. 6 is a flowchart showing the collection and transmission operation of operational information using ZigBee® devices on Z-SW from a connected ZigBee® enabled appliance according to the invention.

FIG. 6 is a flow diagram 6000 showing the incoming operational status handling for the ZigBee® device 410 of the Z-SW 400. This operation of the Z-SW 400 is in addition to the power monitoring and control operation of the standard SW unit 100 shown in FIG. 1.

The ZigBee® technology enabled appliance is connected to the power by plugging it into the power plug 103 of the Z-SW 400 unit (S6001).

The built in ZigBee® device 410 on the Z-SW 400 turns on, monitors, and controls the power flow into the ZigBee® technology enabled appliance (S6002).

The ZigBee® device 410 on the Z-SW 400 is linked to the ZigBee® technology enabled connected appliance to establish communication and connection between the Z-SW and the ZigBee® technology enabled appliance (S6003).

Operational information and status of the ZigBee® technology enabled appliance is collected and communicated to the Z-SW 400 through a communication link established between the ZigBee® device 410 on the Z-SW 400 and the ZigBee® technology enabled appliance (S6004).

The received information is passed to the MCU 107 for processing by the ZigBee® device 410 via the communication link connected to the bi-directional port (S6005).

The MCU 107 caches the information received from the ZigBee® device 410 and converts it into the necessary format, including an address for onward transmission to the master unit over the power line (S6006).

The MCU 107 then sends the prepared information with the forwarding addresses to the broadband communication module 109 of the Z-SW 400 over the link 108 connected to the UART on the communication module 109 (S6007).

The communication module 109 encrypts the received information for security where needed (S6008).

The encrypted data is modulated and sent via the coupler filter 111 to the power line network 101 for delivery to the MST for necessary action, including onward transmission to the addressee over the Internet where necessary (S6009).

Figure 7:
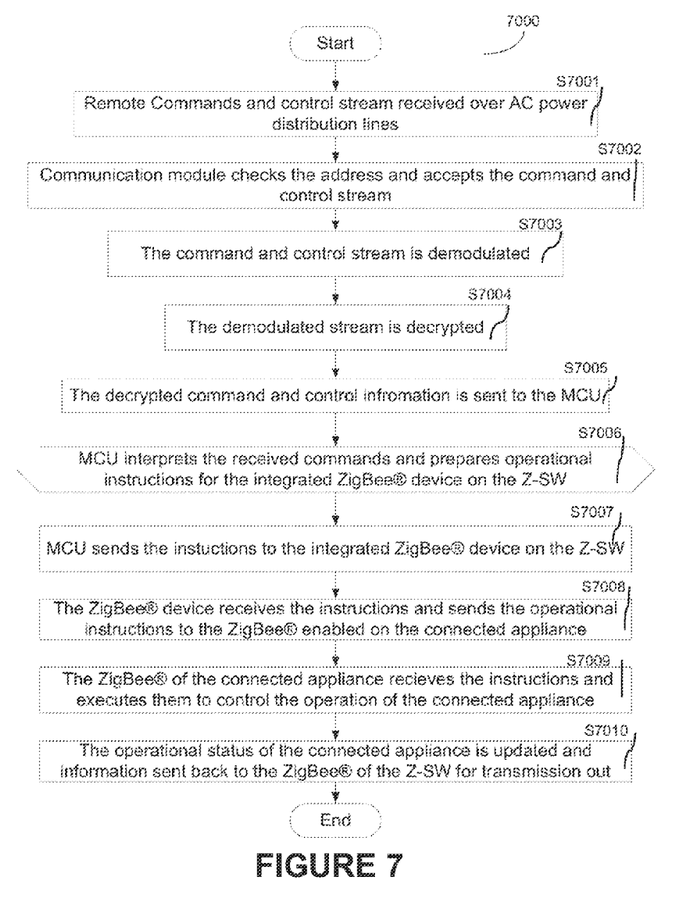
FIG. 7 is a flowchart showing a control operation using the Z-SW according to the invention.

FIG. 7 is a flowchart showing the handling of the remote operational control instructions sent to a connected ZigBee® technology enabled appliance connected to a Z-SW 400 unit for power monitoring and control, as well as for operational control.

Remote commands and a control stream is received from the MST unit over the AC power distribution lines 101 by the communication module 109 of the Z-SW 400 through the coupler filter module 111 (S7001).

The communication module 109 checks the address to verify that the Z-SW 400 is the intended recipient of the data steam and accepts the command and control instruction stream (S7002).

The communication module 109 of the Z-SW 400 demodulates the received data stream to extract the command and control instructions (S7003).

The communication module 109 further decrypts the command and control instructions to extract the information (S7004).

The extracted information is sent by the communication module 109 to the MCU 109 on the Z-SW 400 via the link connected between a bidirectional communication port on the MCU 109 and the UART on the communication module 111 (S7005).

The MCU 109 receives the information stream and interprets the command and control instructions contained therein. It prepares the operational instructions for transmission to the integrated ZigBee® device 410. (S7006).

The operational instructions are sent to the integrated ZigBee® device 410 of the Z-SW 400 through the bi-directional port 411 and the communication link 412 (S7007).

The operational instructions are sent by the integrated ZigBee® device 410 addressed to the ZigBee® technology enabled connected appliance using pre-established wireless connection (S7008).

The operational instructions sent are received by the addressee ZigBee® enabled device on the connected appliance and provide the necessary inputs to the appliance to change or modify the operational status of the connected appliance (S7009).

The resultant operation status is updated and transmitted back to the integrated ZigBee® device 410 on the Z-SW 400 for transmission back to the originator of the command and control instruction stream through the power line and Internet as necessary (S7010).

Typical Connection for the Units Within the Home or Office

Figure 8:
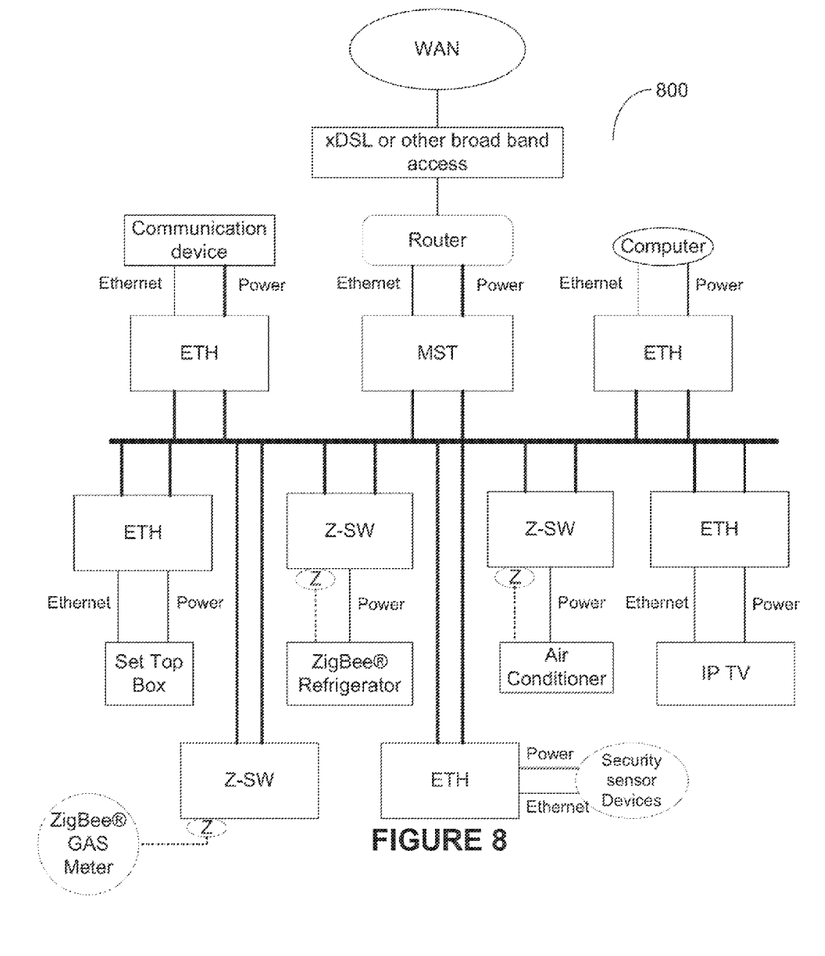
FIG. 8 is a block schematic diagram showing a typical PLC network with connected units, some of which are ZigBee® technology enabled using Z-SW according to the invention.

FIG. 8 is a block schematic diagram 800 showing powered management and communication connectivity using the four types of units of an exemplary embodiment of the invention. The SW units are used where the requirement is for power connection capability with monitoring and control of power, but without the need to connect a communication device into the PLC LAN.

The Z-SW units allow for power monitoring and control, as well as operational control of the ZigBee® technology enabled appliances. The Z-SW can also be used to connect directly to ZigBee® technology enabled metering devices for monitoring usage, such as gas use and water use.

The ETH devices provide the ability to have a communication device connections to the PLC LAN, while providing a power plug or power source which can be monitored and controlled.

Multiple SW, Z-SW, and ETH units can be used to establish the power monitoring and control for the home appliances and provide connectivity for data communication on the PLC LAN level.

The use of a single MST provides the capability to establish a WAN gateway, thus enabling the PLC LAN to communicate with the outside world in view of various security and connection rules. The MST is also used as a collection and compilation point for power monitoring, where the power usage within the home with connected SW, Z-SW, and ETH units is received and compiled. Because there is connectivity with control capability on each SW, Z-SW, and ETH unit, the power delivery through each of these SW, Z-SW, and ETH units can be monitored and controlled from any of the communication devices connected to the PLC LAN. Further, this collected information on any of the power plugs can be accessed from the WAN using connected communication devices to monitor the status and provide remote control commands through the WAN gateway. This capability is controlled by the permissions, authorizations, and security rules established for connection into the PLC LAN through the MST.

The MST also acts as a collection and compilation point for the operational status of the ZigBee® enabled appliances. This enables the user to have complete information concerning the impact of various operational decisions on the operation and working of the ZigBee® enabled appliances over specific periods for budgeting and control purposes.

Because communication connections to the outside world and within the PLC LAN are all broadband enabled, the system can provide steaming media capability within the PLC LAN. It can also access and enable streaming media delivery to display devices connected using ETH units through the WAN gateway.

To facilitate macro level collection and compilation of power usage information, the collected power monitoring and usage information is transmitted over the WAN gateway to one or more central power usage collection units. These units collect the data for analysis and to provide input to the public bodies for use in making policy decisions on greenhouse gas reduction requirements, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A power switch apparatus (Z-SW) for monitoring and control of power usage of one or more ZigBee® technology enabled appliances, comprising:
   an appliance power plug;
   a power meter and relay unit coupled to said power plug, said power meter and relay unit also coupled to an AC power distribution line, said power meter and relay configured for collecting power usage information and relay status;
   a micro controller unit (MCU) module connected to said power meter and relay unit, said MCU configured for receiving power usage information and relay status from said power meter and relay unit;
   a ZigBee® device integrated into said Z-SW and coupled to said MCU through a bidirectional port and communication links on the Z-SW, said ZigBee® device configured for connecting said Z-SW to at least one ZigBee® technology enabled appliance to effect operational control and status update of said ZigBee® technology enabled appliance; and
   a communication module connected to said MCU, said communication module configured to encrypt and modulate information received from said MCU;
   wherein said power meter and relay are configured to control a flow of power to said power plug from said AC power distribution lines based on input from said MCU;
   wherein said ZigBee® device is configured for communicating operational instructions to said ZigBee® technology enabled appliance, for collecting operational status information from said ZigBee® technology enabled appliance, and for remote operational control of said ZigBee® technology enabled appliance over said AC power distribution line; and
   a plurality of sensors, each sensor connected to said AC power distribution line and to an associated controlled ZigBee® technology enabled appliance, each ZigBee® technology enabled appliance powered by power from said AC power distribution line under control of said sensor, each sensor configured for each of:
      collecting power usage information of said connected associated ZigBee® technology enabled appliance;
      executing a power management regimen; and
      providing a connection to establish a local area network (LAN) between said sensors and other networked devices.

2. The power switch apparatus of claim 1, said sensors comprising any one or more, in any combination, of the following:
   an intelligent master sensor (MST) configured to collect, compile, and communicate said collected information via a communication medium, and to receive and distribute instructions for implementing said power management regimen and for effecting control of said ZigBee® technology enabled appliance via said associated sensors;
   a communication and power management sensor (ETH); and
   a power control switch sensor (SW);
   wherein said sensors are configured to provide integrated sensing and control of ZigBee® technology enabled appliance power usage and power management, while establishing a LAN having communication capability, including streaming media delivery capability.

3. The power switch apparatus of claim 1, wherein said Z-SW is configured for connecting a ZigBee® technology enabled appliance to said AC power distribution line; and wherein said Z-SW is configured for monitoring power consumption by, and to effect remote control of, a ZigBee® technology enabled appliance connected thereto.

4. The power switch apparatus of claim 1, each sensor further comprising:
   a communication module configured for modulating said collected information to a communication data stream for transmission over a broadband communication frequency band to effect power line communication (PLC) over said power line within said local area network (LAN); and
   said communications module configured for demodulating a broadband communication stream that is received over said power line to provide command and control instructions for power control of a power flow to said associated ZigBee® technology enabled appliance.

5. The power switch apparatus of claim 1, each sensor further comprising:
a communication module configured for modulating collected power usage information to a communication data stream for transmission over a narrowband communication frequency band to effect narrowband communication over said AC power distribution line within said local area network (LAN); and
said communications module configured for demodulating a narrowband communication stream that is received over said AC power distribution line to provide command and control instructions for power control of a power flow to said associated ZigBee® technology enabled appliance.

6. The power switch apparatus of claim 1, wherein said ETH is configured for connecting a ZigBee® technology enabled appliance to said AC power distribution line; wherein said ETH is configured for monitoring power consumption by, and to effect remote control of, a ZigBee® technology enabled appliance connected thereto; wherein said ETH is configured for providing broadband PLC based data communication, where the data and communication devices are connected to said AC power distribution line through a communication port; and wherein multiple ETH units are connected via said AC power distribution line to establish a PLC based LAN.

7. The power switch apparatus of claim 1, wherein said MST comprises a processor and memory; wherein said MST is configured for collecting and compiling power consumption information and for connecting a ZigBee® technology enabled appliance to said AC power distribution line; wherein said MST is configured for monitoring power consumption by, and to effect remote control of, a ZigBee® technology enabled appliance connected thereto; and wherein said MST is configured for connection to said SWs and ETHs.

8. The power switch apparatus of claim 1, said appliance power plug further comprising:
a noise filter.

9. The power switch apparatus of claim 1, further comprising:
a coupler filter module connected to said communication module and said AC power distribution line.

10. A method for monitoring and control of power usage of one or more ZigBee® technology enabled appliances, comprising:
providing a power switch apparatus comprising:
an appliance power plug;
a power meter and relay unit coupled to said power plug, said power meter and relay unit also coupled to an AC power distribution line, said power meter and relay configured for collecting power usage information and relay status;
a micro controller unit (MCU) module connected to said power meter and relay unit, said MCU configured for receiving power usage information and relay status from said power meter and relay unit; and
a communication module connected to said MCU, said communication module configured to encrypt and modulate information received from said MCU;
integrating a ZigBee® device into said Z-SW and coupling said ZigBee® device to said MCU through a bidirectional port and communication links on the power switch apparatus;
configuring said ZigBee® device for connecting said power switch apparatus to at least one ZigBee® technology enabled appliance to effect operational control and status update of said ZigBee® technology enabled appliance;
configuring said power meter and relay to control a flow of power to said power plug from said AC power distribution lines based on input from said MCU; and
configuring said ZigBee® device for communicating operational instructions to said ZigBee® technology enabled appliance, for collecting operational status information from said ZigBee® technology enabled appliance, and for remote operational control of said ZigBee® technology enabled appliance over said AC power distribution line;
configuring a plurality of sensors, each sensor connected to said AC power distribution line and to an associated controlled ZigBee® technology enabled appliance, each ZigBee® technology enabled appliance powered by power from said AC power distribution line under control of said each sensor;
collecting, by said each sensor, power usage information of said connected associated ZigBee® technology enabled appliance;
executing, by said each sensor, a power management regimen; and
providing, by said each sensor, a connection to establish a local area network (LAN) between said each sensor and other networked devices.

11. A power switch apparatus (Z-SW) for monitoring and control of power usage of one or more ZigBee® technology enabled appliances, comprising:
an appliance power plug comprising a noise filter;
a power meter and relay unit coupled to said power plug, said power meter and relay unit also coupled to an AC power distribution line, said power meter and relay configured for collecting power usage information and relay status;
a micro controller unit (MCU) module connected to said power meter and relay unit, said MCU configured for receiving power usage information and relay status from said power meter and relay unit;
a ZigBee® device integrated into said Z-SW and coupled to said MCU through a bidirectional port and communication links on the Z-SW, said ZigBee® device configured for connecting said Z-SW to at least one ZigBee® technology enabled appliance to effect operational control and status update of said ZigBee® technology enabled appliance; and
a communication module connected to said MCU, said communication module configured to encrypt and modulate information received from said MCU;
a coupler filter module connected to said communication module and said AC power distribution line;
wherein said power meter and relay are configured to control a flow of power to said power plug from said AC power distribution lines based on input from said MCU;
wherein said ZigBee® device is configured for communicating operational instructions to said ZigBee® technology enabled appliance, for collecting operational status information from said ZigBee® technology enabled appliance, and for remote operational control of said ZigBee® technology enabled appliance over said AC power distribution line;
a plurality of sensors, each sensor connected to said AC power distribution line and to an associated controlled ZigBee® technology enabled appliance, each ZigBee® technology enabled appliance powered by power from said AC power distribution line under control of said sensor, each sensor configured for each of:

collecting power usage information of said connected associated ZigBee® technology enabled appliance;

executing a power management regimen; and providing a connection to establish a local area network (LAN) between said sensors and other networked devices.

\* \* \* \* \*